US009039971B2

(12) United States Patent
Motadel

(10) Patent No.: US 9,039,971 B2
(45) Date of Patent: May 26, 2015

(54) MANUFACTURE PROCESSES FOR ASSESSING PIPETTE TIP QUALITY

(75) Inventor: Arta Motadel, San Diego, CA (US)

(73) Assignee: Biotix, Inc, San Diego, CA (US)

( * ) Notice: Subject to any disclaimer, the term of this patent is extended or adjusted under 35 U.S.C. 154(b) by 231 days.

(21) Appl. No.: 13/571,928

(22) Filed: Aug. 10, 2012

(65) Prior Publication Data

US 2012/0306190 A1 Dec. 6, 2012

Related U.S. Application Data

(62) Division of application No. 12/685,600, filed on Jan. 11, 2010, now abandoned.

(60) Provisional application No. 61/144,319, filed on Jan. 13, 2009.

(51) Int. Cl.

*G01N 21/00* (2006.01)
*B01L 3/00* (2006.01)
*B01L 9/00* (2006.01)

(52) U.S. Cl.

CPC . *B01L 3/54* (2013.01); *B01L 9/543* (2013.01); *B01L 2200/12* (2013.01); *B01L 2200/148* (2013.01)

(58) Field of Classification Search

USPC .................... 422/67, 68.1, 501, 564; 235/385
See application file for complete search history.

(56) References Cited

U.S. PATENT DOCUMENTS

| | | | | |
|---|---|---|---|---|
| 3,986,834 | A | 10/1976 | Steinbrink, Jr. | |
| 4,873,193 | A | 10/1989 | Jensen et al. | |
| 5,057,282 | A | 10/1991 | Linder | |
| 5,143,210 | A | 9/1992 | Warwick et al. | |
| 5,156,811 | A | 10/1992 | White | |
| 5,392,914 | A | 2/1995 | Lemieux et al. | |
| 5,622,676 | A * | 4/1997 | Lind | 422/564 |
| 5,897,835 | A | 4/1999 | Seaton et al. | |
| 6,517,783 | B2 | 2/2003 | Horner et al. | |
| 6,770,244 | B2 | 8/2004 | Hool et al. | |
| 7,335,337 | B1 | 2/2008 | Smith | |
| 2007/0017870 | A1 | 1/2007 | Belov | |
| 2010/0219093 | A1 | 9/2010 | Motadel | |
| 2012/0275956 | A1* | 11/2012 | Wakamiya et al. | 422/68.1 |
| 2013/0142711 | A1* | 6/2013 | Wilson et al. | 422/554 |

OTHER PUBLICATIONS

Office Action dated: Jun. 1, 2012in U.S. Appl. No. 12/685,600, filed Jan. 11, 2010 and published as: 2010/0219093 on Sep. 2, 2010.
Office Action dated: Dec. 13, 2011 in U.S. Appl. No. 12/685,600, filed Jan. 11, 2010 and published as: 2010/0219093 on Sep. 2, 2010.

* cited by examiner

*Primary Examiner* — Ahshik Kim
(74) *Attorney, Agent, or Firm* — Grant IP, Inc

(57) ABSTRACT

Provided in part are processes for manufacturing pipette tip trays that improve quality assessment of the pipette tips therein.

21 Claims, 1 Drawing Sheet

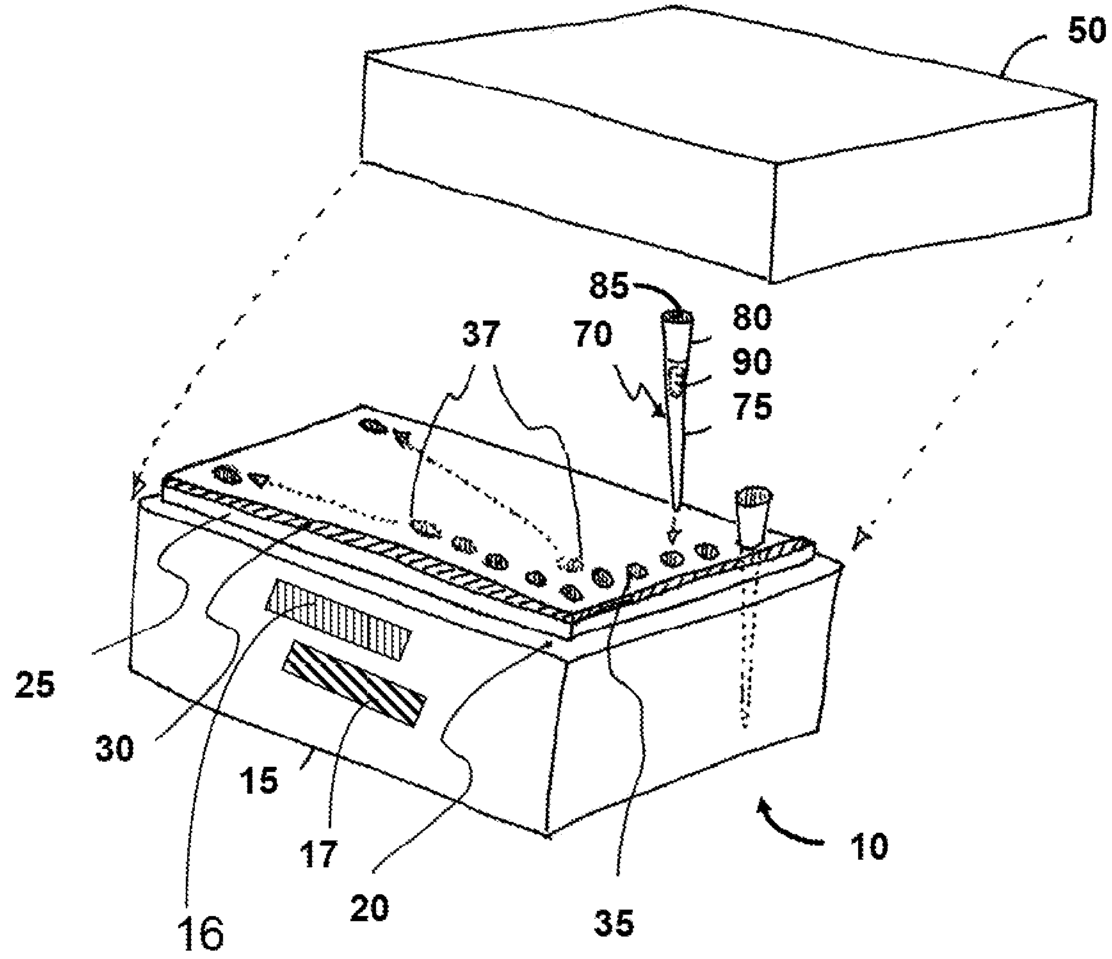
50
85
80
37
70
90
75
25
30
15
17
16
20
35
10

MANUFACTURE PROCESSES FOR ASSESSING PIPETTE TIP QUALITY

RELATED PATENT APPLICATION

This patent application is a divisional of U.S. Non-Provisional patent application Ser. No. 12/685,600 filed on Jan. 11, 2010, entitled MANUFACTURE PROCESSES FOR ASSESSING PIPETTE TIP QUALITY, naming Arta Motadel as an inventor, which claims the benefit of U.S. Provisional Patent Application No. 61/144,319 filed on Jan. 13, 2009, entitled MANUFACTURE PROCESSES FOR ASSESSING PIPETTE TIP QUALITY, naming Arta Motadel as an inventor. The entire contents of the foregoing patent applications are hereby incorporated by reference, including all text, tables and drawings.

FIELD

The technology pertains in part to pipette tips and associated components.

BACKGROUND

Pipette tips are utilized in a variety of industries that have a requirement for handling fluids, and are used in facilities including medical laboratories and research laboratories, for example. Pipette tips often are cone-shaped with an aperture at one end that can engage a dispensing device, and another relatively smaller aperture at the other end that can receive and emit fluid. Pipette tips generally are manufactured from a moldable plastic, such as polypropylene, for example. Pipette tips can be utilized in conjunction with a variety of dispensing devices, including manual pipette devices and automated robotic dispensers.

Pipette tips often are provided by manufacturers in a pipette tip tray, which includes a substantially hollow rack body and a perforated card affixed to the top of the body. Pipette tips generally are inserted in apertures of the card and are thereby arranged in an array. A pipette tip tray sometimes is provided with a lid that covers the pipette tips, and sometimes each of the pipette tips includes a filter. A pipette tip manufacturer often provides a collection of pipette tip trays to customers in a container (e.g., a box container).

DETAILED DESCRIPTION

Pipette tip quality can be affected and assessed by a number of criteria. Specific criteria for pipette tip quality sometimes include, for example, (i) tip structural integrity, (ii) ability to readily form a sealing fit with a dispenser and (iii) ability to be ejected readily from a dispenser. The ability of pipette tips to deliver accurate and precise volumes of fluid sometimes is another aspect of pipette tip quality. For example, pipette tips that precisely deliver a fluid volume often is a requirement for robotic dispenser applications. Pipette tip "precision" refers to the ability of a plurality of pipette tips to deliver about the same volume of fluid, with a relatively small standard deviation, for a given dispenser (e.g., pipette tips stated to deliver 200 microliters of fluid consistently deliver about 197 microliters of fluid on repeated attempts). Pipette tip "accuracy" refers to the ability of a plurality of pipette tips to deliver a particular volume of fluid (e.g., pipette tips stated to deliver 200 microliters of fluid deliver, in practice, about 200 microliters of fluid). One measure of pipette tip precision is a calculated percent "coefficient of variation," which also is referred to herein as "CV" and discussed in greater detail hereafter.

Methods and products provided herein provide several advantages. In certain embodiments, a user can readily ascertain the precision and/or accuracy of pipette tips in trays provided herein. In some embodiments, a manufacturer assesses the precision and/or accuracy of pipette tips, and marks on a container the precision and/or accuracy of the pipette tips contained therein.

Upon discovering that certain pipette tips in a pipette tip tray are defective, a user and/or manufacturer advantageously can ascertain which pipette tip trays may include tips with the same defect, in some embodiments. In certain embodiments, a manufacturer can track the lot number of pipette tips assembled in each pipette tip tray in a manufacturing run, assign a unique serial number to each of the pipette tip trays and associate the serial number with the pipette tip component lot number. Thus, upon discovering that one tray includes defective pipette tips, other trays potentially containing defective pipette tips from the same manufacture lot can be identified based on the serial number associated with each pipette tip tray.

Thus, provided herein is a process for manufacturing pipette tip trays having a rack, a card affixed to the rack and pipette tips mounted in the card, which comprises: (a) providing pipette tip, card and rack components, and the lot number or lot numbers for the pipette tip components; (b) assembling the components to form pipette tip trays; (c) assigning a unique serial number to each pipette tip tray; (d) recording the lot number of each pipette tip component in each pipette tip tray for each serial number; and (e) affixing the serial number to the pipette tip tray.

Also provided is a process for determining the lot number of a pipette tip component of a pipette tip tray, which comprises: (a) identifying a serial number for a pipette tip tray, where: the pipette tip tray comprises a rack, a card affixed to the rack, pipette tips mounted in the card and a serial number affixed to the pipette tip tray, the serial number is specific to the pipette tip tray (e.g., the serial number is different than serial numbers for other pipette tip trays), and the serial number is associated with the lot number of pipette tip components in the pipette tray; and (b) determining the lot number of the pipette tip components of the pipette tip tray from the serial number. In certain embodiments, the process also comprises one or more of the following: locating pipette tip trays having pipette tips manufactured in the same lot number identified; collecting pipette tip trays, and/or one or more components thereof, having pipette tips manufactured in the same lot number identified; and destroying or recycling pipette tip trays having pipette tips manufactured in the lot number identified. The processes described may be applicable to the lot number of a component other than pipette tips in certain embodiments (e.g., lot numbers of rack, lid, card, filters and/or inserts), and sometimes is applicable to lot numbers for two or more components.

Provided also is a pipette tip tray comprising rack, card and pipette tip components and a serial number affixed to the tray, where: (a) the card is affixed to the rack and the pipette tips are mounted in the card, (b) the serial number is unique for the pipette tip tray (e.g., the serial number is different than serial numbers for other pipette tip trays), and (c) the serial number is associated with the lot number of the pipette tip component in the pipette tip tray.

A pipette tip tray generally is an assembly of components that present pipette tips for use by a user. A pipette tip tray can contain any suitable combination of components that facilitate presentation of pipette tips, including, but not limited to, a rack component, a card component and a lid component. A rack component often comprises four sides, and optionally contains a grid structure within the body that confers rigidity to the rack component. A card component includes, in some embodiments, multiple apertures through which pipette tips are inserted in a process of assembling the pipette tip tray. A card component sometimes is affixed to a rack component via a snap fit, and a card component sometimes is affixed to a rack component by a sonic or heat weld. Pipette tips are inserted partially in the card, in certain embodiments, such that a portion of each pipette tip resides below the lower card surface within the rack body. A card component can contain any suitable number of apertures, including, without limitation, 8, 16, 24, 32, 40, 48, 56, 64, 72, 80, 88, 96, 384 or 1536 apertures, and pipette tips may be inserted in all, or a subset, of the apertures in a card component of a pipette tip tray.

A pipette tip can be of any geometry useful for dispensing fluids in combination with a dispensing device. Pipette tips sometimes are available in sizes that hold from 0 to 10 microliters, 0 to 20 microliters, 1 to 100 microliters, 1 to 200 microliters and from 1 to 1000 microliters, for example. The external appearance of pipette tips may differ, and certain pipette tips can have a continuous tapered wall forming a central channel or tube that is roughly circular in horizontal cross section, in some embodiments. A pipette tip can have any cross-sectional geometry that results in a tip that (i) provides suitable flow characteristics, and (ii) can be fitted to a dispenser (e.g., pipette), for example. Pipette tips sometimes taper from the widest point at the top-most portion of the pipette tip (pipette proximal end or end that engages a dispenser), to a narrow opening at the bottom most portion of the pipette tip (pipette distal end or end used to acquire or dispel fluid). In certain embodiments, a pipette tip wall includes two or more taper angles. The inner surface of the pipette tip sometimes forms a tapered continuous wall, in some embodiments, and in certain embodiments, the external wall may assume an appearance ranging from a continuous taper to a stepped taper or a combination of smooth taper with external protrusions. An advantage of an externally stepped taper is compatibility with pipette tip racks from different manufacturers. The bore of the top-most portion of the central channel or tube generally is wide enough to accept a particular dispenser apparatus (e.g., nozzle, barrel).

In some embodiments, a pipette tip has (i) an overall length of about 1.10 inches to about 3.50 inches (e.g., about 1.25, 1.50, 1.75, 2.00, 2.25, 2.50, 2.75, 3.00, 3.25 inches); (ii) a fluid-emitting distal section terminus having an inner diameter of about 0.01 inches to about 0.03 inches (e.g., about 0.015, 0.020, 0.025 inches) and an outer diameter of about 0.02 to about 0.7 inches (e.g., about 0.025, 0.03, 0.04, 0.05, 0.06 inches); and (iii) a dispenser-engaging proximal section terminus having an inner diameter of about 0.10 inches to about 0.40 inches (e.g., about 0.15, 0.20, 0.25, 0.30, 0.35 inches) and an outer diameter of about 0.15 to about 0.45 inches (e.g., about 0.20, 0.25, 0.30, 0.35, 0.45 inches). In the latter embodiments, the inner diameter is less than the outer diameter.

The wall of the distal section of a pipette tip sometimes is continuously tapered from the wider portion, which is in effective connection with the proximal section, to a narrower terminus. The wall of the distal section, in some embodiments, forms a stepped tapered surface. The angle of each taper in a distal section is between about zero degrees to about thirty degrees from the central longitudinal vertical axis of the pipette tip (e.g., about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 degrees), in certain embodiments. In some embodiments, the wall of the distal section forms stepped vertical sections. The wall thickness of a distal section may be constant along the length of the section, or may vary with the length of the section (e.g., the wall of the distal section closer to the proximal section of the pipette tip may be thicker or thinner than the wall closer to the distal section terminus; the thickness may continuously thicken or thin over the length of the wall). The distal section of a pipette tip generally terminates in an aperture through which fluid passes into or out of the distal portion of the pipette tip. A distal section of a pipette tip may contain a filter, insert or other material.

The wall of the proximal section of a pipette tip sometimes is continuously tapered from the top portion, to a narrower terminus towards the distal end. The top portion generally is open and often is shaped to receive a pipette tip engagement portion of a dispensing device. The wall of a proximal section, in some embodiments, forms a stepped tapered surface. The angle of each taper in the proximal section is between about zero degrees to about thirty degrees from the central longitudinal vertical axis of the pipette tip (e.g., about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 degrees), in certain embodiments. The wall thickness of a proximal section may be constant over the length of the section, or may vary with the length of the proximal section (e.g., the wall of the proximal section closer to the distal section of the pipette tip may be thicker or thinner than the wall closer to the top of the proximal section; the thickness may continuously thicken or thin over the length of the wall). A proximal section of a pipette tip may contain a filter, insert or other material.

In certain embodiments, pipette tips in a pipette tray comprise one or more of a filter component and/or an insert component. A filter may be located in any suitable portion of a pipette tip, and sometimes is located in a proximal portion of a pipette tip near a pipette tip aperture that can engage a dispensing device. A filter can be of any shape (e.g., plug, disk; U.S. Pat. Nos. 5,156,811 and 7,335,337) and can be manufactured from any material that impedes or blocks migration of aerosols through the pipette tip to the proximal section terminus or visa versa, including without limitation, polyester, cork, plastic, silica, gels, and the like, and combinations thereof. In some embodiments a filter may be porous, non-porous, hydrophobic, hydrophilic or a combination thereof. A filter in some embodiments may include vertically oriented pores, and the pore size may be regular or irregular. Pores of a filter may include a material (e.g., granular material) that can expand and plug pores when contacted with aerosol (e.g., U.S. Pat. No. 5,156,811). In certain embodiments, a filter may include nominal, average or mean pore sizes of about 30, 25, 20, 15, 10, 9, 8, 7, 6, 5, 4, 3, 2, 1, 0.5, or 0.05 micrometers, for example. A section of a pipette tip also may include an insert or material that can interact with a molecule of interest, such as a biomolecule. The insert or material may be located in any suitable location for interaction with a molecule of interest, and sometimes is located in the distal section of a pipette tip (e.g., a material or a terminus of an insert may be located at or near the terminal aperture of the distal section). An insert may comprises one or more components that include, without limitation, multicapillaries (e.g., US 2007/0017870), fibers (e.g., randomly oriented or stacked, parallel orientation), and beads (e.g., silica gel, glass (e.g. controlled-pore glass (CPG)), nylon, Sephadex®, Sepharose®, cellulose, a metal surface (e.g. steel, gold, silver, aluminum, silicon and copper), a magnetic material, a plastic material (e.g., polyethylene, polypropylene, polyamide, polyester, polyvinylidenedifluoride (PVDF)), Wang resin, Merrifield resin or Dynabeads®). Beads may be sintered (e.g., sintered glass beads) or may be free (e.g., between one or two barriers (e.g., filter, frit)). Each insert may be coated or derivatized (e.g., covalently or non-covalently modified) with a molecule that can interact with (e.g., bind to) a molecule of interest (e.g., C18, nickel, affinity substrate, antibody, ligand, cofactor, binding partner, metal and the like).

Each pipette tip tray component can be manufactured from a commercially suitable material. Pipette tip tray components often are manufactured from one or more moldable materials, independently selected from those that include, without limitation, polypropylene (PP), polyethylene (PE), high-density polyethylene, low-density polyethylene, polyethylene teraphthalate (PET), polyvinyl chloride (PVC), polyethylene-fluoroethylene (PEFE), polystyrene (PS), high-density polystryrene, acrylnitrile butadiene styrene copolymers, crosslinked polysiloxanes, polyurethanes, (meth)acrylate-based polymers, cellulose and cellulose derivatives, polycarbonates, ABS, tetrafluoroethylene polymers, corresponding copolymers and the like. A pipette tip tray component also may include one or more antimicrobial materials (e.g., antimicrobial metal, silver, gold). An antimicrobial material may be coated on a surface (e.g., inner and/or outer surface) or impregnated in a moldable material, in some embodiments. One or more portions or sections, or all portions and sections, of a pipette tip or other pipette tip tray component may include one or more antimicrobial materials.

FIG. 1 illustrates certain non-limiting embodiments of pipette tip trays. FIG. 1 shows a top isometric view of a pipette tip rack embodiment. The pipette tip tray embodiment shown in FIG. 1 includes a rack body 15, an indentation formed by lip 20 and rise 25 in which a bottom portion of lid 50 may rest, a perforate card 30 affixed to the rack body, and apertures 35 and 37 in the card. FIG. 1 shows only some of the apertures (e.g., apertures 37) in the perforate card and the card includes an array of apertures shaped to receive pipette tips across the entire surface of the card in the illustrated embodiment. Pipette tips 70 can be inserted into apertures 35 and 37 of card 30. Pipette tips include a proximal region 80, proximal aperture 85, distal region 75 and filter 90 within a portion of the hollow space of the pipette tip embodiment illustrated.

In certain embodiments, the pipette tip components in one pipette tip tray are from one lot. The term "lot" as used herein refers to units of a particular component manufactured in a manufacture process. In certain embodiments, a "lot" of a particular component is produced in a certain manufacture run of the component. A manufacturing run of a particular component generally utilizes a particular batch of materials to produce the component (e.g., a particular batch of polypropylene is utilized to mold a certain number of pipette tips). The pipette tips of a "lot" then are utilized in an assembly process that places multiple pipette tips in a pipette tip tray, in certain embodiments. A manufacturer often ascribes a "lot number" to track a particular lot of components. A lot number can be of any suitable length and contain any convenient types of characters (e.g., numbers, letters, symbols, bar code and combinations thereof). One or more lot numbers for a particular component can be provided and associated with a serial number (e.g., a lot number for each of card, rack, lid, filter and pipette tip components) in processes described herein.

A serial number (16, FIG. 1) can be of any suitable length and contain any convenient types of characters (e.g., numbers, letters, symbols, bar code and combinations thereof). A serial number generally is unique or specific for a particular pipette tip tray, and is identifiably distinct and different than serial numbers affixed to other pipette tip trays. A serial number also generally is associated with a lot number for one or more components of the pipette tip tray (e.g., pipette tips, card, rack, lid, filters, inserts), and in some embodiments, a serial number is associated with a lot number for each of multiple components (e.g., associated with a lot number for pipette tips, a lot number for the card, a lot number for the rack, a lot number for the lid, a lot number for filters, a lot number for inserts, or subset thereof).

A serial number can be associated with a lot number for one or more pipette tip tray components in any convenient recordable medium. A serial number may be associated with one or more lot numbers in a suitable medium and manner (e.g., a serial number can be paired with a lot number of one or more components in a table). The medium can be tangible (e.g., paper) or intangible (e.g., electronic medium), and examples of media include, but are not limited to, computer media, databases, records, graphs and tables, and any other suitable medium of expression. The serial number and lot number information sometimes is stored and/or renditioned in computer readable form and sometimes is stored and organized in a database. In certain embodiments, the information may be transferred from one location to another using a physical medium (e.g., paper) or a computer readable medium (e.g., optical and/or magnetic storage or transmission medium, floppy disk, hard disk, random access memory, computer processing unit, facsimile signal, satellite signal, transmission over an internet or transmission over the World-Wide Web). Lot numbers and serial numbers can be recorded into or onto a particular medium in any convenient manner (e.g., recorded by data entry into a database, bar code scanning and transport or entry into a database). A serial number, and lot number information for each serial number, generally are associated in a manner that allows access of one type of information when one or the other is known (e.g., if a serial number is known, associated lot number information may be accessed; if a particular lot number is known for pipette tips or other component, associated serial numbers may be accessed).

A plurality of pipette tip trays may be stacked, packaged, transported and/or shipped in a container. A container of any suitable type (e.g., box, envelope, cylinder, barrel) and material (e.g., paper, cardboard, plastic, wood) can be utilized, such as a container utilized for shipping. A container may contain any convenient number of pipette tip trays, including, without limitation, about 5, 10, 15, 20, 25, 30, 35, 40, 45, 50, 55, 60, 65, 70, 75, 80, 85, 90, 95, 100 or more pipette tip trays.

Also provided herein is a process for manufacturing pipette tip trays having a rack, a card affixed to the rack and pipette tips mounted in the card, which comprises: (a) providing pipette tip, card and rack components, where the pipette tip components are from one lot; (b) assembling the components to form pipette tip trays; (c) measuring a coefficient of variation (CV) value for pipette tips in the lot; (d) placing the pipette tip trays in a container; and (e) affixing the CV value to the container.

Provided also is a process for manufacturing a container comprising a plurality of pipette tip trays, which comprises: (a) providing a plurality of pipette tip trays comprising pipette tip, card and rack components, where the card is affixed to the rack, the pipette tips are mounted in the card and the pipette tip components are from one lot; (b) placing the pipette tip trays in a container; and (c) affixing to the container a coefficient of variation (CV) value measured for pipette tips in the lot.

Also provided is a container comprising a plurality of pipette tip trays each comprising rack, card and pipette tip components, where: (a) the card is affixed to the rack and the pipette tips are mounted in the card; (b) the pipette tips in the plurality of pipette tip trays are from one lot of pipette tips; and (c) affixed to the container is a coefficient of variation value measured for the lot of pipette tips.

A CV value (17, FIG. 1) sometimes is affixed to a pipette tip tray, a pipette tip tray container or both, in certain embodiments. Coefficient of variation (CV) can be calculated for a pipette tip lot in a variety of manners. In general, percent CV equals (a) the quotient of (i) standard deviation in volume dispensed from the pipette tips, divided by (ii) the average volume dispensed from the pipette tips, (b) multiplied by 100. In certain embodiments, a CV value can be expressed as a quotient and not a percent (e.g., as the quotient in (a) without multiplying by 100 in (b)). A CV value often is calculated for a particular lot of pipette tips. One of many protocols can be selected for collecting pipette tips in the lot to calculate a CV value. Pipette tips may be selected randomly from a lot after a manufacturing run is completed in some embodiments, and in certain embodiments, pipette tips are collected at different time points during the manufacturing run of the lot (e.g., pipette tips are collected at time points during the manufacture run at regular intervals).

In certain embodiments pertaining to CV measurements, water is dispensed from pipette tips of a particular lot using one dispensing device, and volume of each dispensed amount is weighed. The average and standard deviation of all weighed aliquots of water then can be calculated in such embodiments.

In some embodiments pertaining to CV measurements, liquid containing a dye is dispensed from each pipette tip into a well of a tray having an array of wells. The average volume can be determined from the weight of the plate containing the dispensed liquid less the weight of the plate before liquid was dispensed. The standard deviation in volume dispensed into each well can be determined by optically determining the volume in each well by the amount of dye in each well (e.g., using a light, fluorescence, luminescence or absorbance detector in a plate reader).

In embodiments that include affixing a CV value to a container and/or a pipette tip tray, an accuracy value measured for pipette tips in the same lot for which the CV value is determined also is affixed to the container and/or pipette tip tray. In certain embodiments, the accuracy value is an average, mean or nominal volume dispensed by the pipette tips in the lot using a dispenser.

A serial number, CV value and/or accuracy value (collectively, "product information") may be affixed in any convenient manner. For example, product information may be printed on a label and the label may be adhered to a pipette tip tray or container. In some embodiments, product information is directly printed, stamped or embossed onto a pipette tip tray or container. Any suitable type of printing medium can be utilized (e.g., ink) that can be detected by any convenient detection process (e.g., visual, optical, magnetic detection). In certain embodiments, product information can be etched onto a pipette tip tray or container. Any suitable method of etching can be utilized (e.g., laser etching, mechanical etching, chemical etching), provided the etching technique does not negatively affect the CV or accuracy of the pipette tips. Product information may be affixed in a convenient location. For example, a serial number can be affixed to a rack or lid of a pipette tip tray in some embodiments, and in certain embodiments, a CV value can be affixed to a pipette tip tray, container, rack or lid.

Certain non-limiting embodiments are presented hereafter.

1. A process for manufacturing pipette tip trays having a rack, a card affixed to the rack and pipette tips mounted in the card, which comprises:
(a) providing pipette tip, card and rack components, and the lot number or lot numbers for the pipette tip components;
(b) assembling the components to form pipette tip trays;
(c) assigning a unique serial number to each pipette tip tray;
(d) recording the lot number of each pipette tip component in each pipette tip tray for each serial number; and
(e) affixing the serial number to the pipette tip tray.

2. A process for determining the lot number of a component of a pipette tip tray, which comprises:
(a) identifying a serial number for a pipette tip tray, wherein:
the pipette tip tray comprises a rack, a card affixed to the rack, pipette tips mounted in the card and a serial number affixed to the pipette tip tray,
the serial number is specific to the pipette tip tray, and the serial number is associated with the lot number of pipette tip components in the pipette tray; and
(b) determining the lot number of the pipette tip components of the pipette tip tray from the serial number.

3. A process for manufacturing pipette tip trays having a rack, a card affixed to the rack and pipette tips mounted in the card, which comprises:
(a) providing pipette tip, card and rack components, wherein the pipette tip components are from one lot;
(b) assembling the components to form pipette tip trays;
(c) measuring a coefficient of variation (CV) value for pipette tips in the lot;
(d) placing the pipette tip trays in a container; and
(e) affixing the CV value to the container and/or pipette tip trays.

3.1. A process for manufacturing pipette tip trays having a rack, a card affixed to the rack and pipette tips mounted in the card, which comprises:
(a) providing pipette tip, card and rack components, wherein the pipette tip components are from one lot;
(b) assembling the components to form pipette tip trays;
(c) measuring a coefficient of variation (CV) value for pipette tips in the lot; and
(d) affixing the CV value to the pipette tip trays.

3.2. The process of embodiment 3.1, which comprises placing the pipette tip trays in a container.

3.3. The process of embodiment 3.2, which comprises affixing the CV value to the container.

4. A process for manufacturing a container comprising a plurality of pipette tip trays, which comprises:
(a) providing a plurality of pipette tip trays comprising pipette tip, card and rack components, wherein the card is affixed to the rack, the pipette tips are mounted in the card and the pipette tip components are from one lot;
(b) placing the pipette tip trays in a container; and
(c) affixing to the container and/or pipette tip tray a coefficient of variation (CV) value measured for pipette tips in the lot.

5. The process of any one of embodiments 1 to 4, wherein each of the pipette tip trays comprises a lid component.

6. The process of any one of embodiments 1 to 5, wherein each of the pipette tips in the pipette tip trays comprises a filter component.

7. The process of any one of embodiments 1, 2, 5 and 6, wherein the pipette tip components in one tray are from one lot.

8. The process of any one of embodiments 3, 4, 5 and 6, which comprises affixing to the container an accuracy value measured for pipette tips in the lot.
9. A pipette tip tray comprising rack, card and pipette tip components and a serial number affixed to the tray, wherein:

the card is affixed to the rack and the pipette tips are mounted in the card, the serial number is unique for the pipette tip tray, and the serial number is associated with the lot number of the pipette tip component in the pipette tip tray.

10. The pipette tip tray of embodiment 9, wherein each of the pipette tip trays comprises a lid component.
11. The pipette tip tray of embodiment 9 or 10, wherein each of the pipette tips in the pipette tip trays comprises a filter component.
12. The pipette tip tray of any one of embodiments 9 to 11, wherein the pipette tip components in one tray are from one lot.
13. A container comprising a plurality of pipette tip trays each comprising rack, card and pipette tip components, wherein:

the card is affixed to the rack and the pipette tips are mounted in the card;

the pipette tips in the plurality of pipette tip trays are from one lot of pipette tips; and affixed to the container is a coefficient of variation value measured for the lot of pipette tips.

14. The container of embodiment 13, wherein each of the pipette tip trays comprises a lid component.
15. The container of embodiment 13 or 14, wherein each of the pipette tips in the pipette tip trays comprises a filter component.
16. The container of any one of embodiments 13-16, which comprises affixing to the container an accuracy value measured for pipette tips in the lot.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology described herein.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the claimed technology. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" is about 1, about 2 and about 3). For example, a weight of "about 100 grams" can include weights between 90 grams and 110 grams. Further, when a listing of values is described herein (e.g., 50%, 60%, 70% or 80%), the listing includes all intermediate values thereof (e.g., 62%, 77%). Thus, it should be understood that although the present technology has been specifically disclosed by representative embodiments and optional features, modification and variation of the concepts herein disclosed may be resorted to by those skilled in the art, and such modifications and variations are considered within the scope of the technology described herein.

Embodiments of the technology are set forth in the claims that follow.

What is claimed is:

1. A process for manufacturing a pipette tip tray, comprising:

(a) providing components comprising pipette tips and a manufacturing run for the pipette tips;

(b) assembling the components to form a pipette tip tray, wherein the pipette tips in the tray are from one manufacturing run;

(c) assigning a unique serial number to the pipette tip tray;

(d) associating the serial number to the manufacturing run of the pipette tips in the pipette tip tray; and (e) affixing the serial number to the pipette tip tray.

2. The process of claim 1, wherein the pipette tip tray comprises a lid component.

3. The process of claim 1, wherein the pipette tip tray comprises a rack component.

4. The process of claim 1, wherein the pipette tip tray comprises a card component.

5. The process of claim 1, wherein each of the pipette tips in the pipette tip tray comprises a filter component.

6. The process of claim 1, which comprises determining an accuracy value for the pipette tips in the manufacturing run.

7. The process of claim 6, which comprises affixing the accuracy value to the pipette tip tray.

8. The process of claim 6, which comprises placing the pipette tip tray into a container comprising other pipette tip trays, wherein the pipette tips in the pipette tip trays in the container are from one manufacturing run, and affixing the accuracy value to the container.

9. The process of claim 1, which comprises determining a precision value for pipette tips in the manufacturing run.

10. The process of claim 9, wherein the precision value is a coefficient of variation (CV) value.

11. The process of claim 10, which comprises affixing the CV to the pipette tip tray.

12. The process of claim 10, which comprises placing the pipette tip tray into a container comprising other pipette tip trays, wherein the pipette tips in the pipette tip trays in the container are from one manufacturing run, and affixing the CV to the container.

13. A process for determining a manufacturing run of a component of a pipette tip tray, which comprises:

(a) loading pipette tips into a pipette tip tray comprising a rack and a card affixed to the rack, whereby the pipette tips are mounted in the card, wherein each component in the pipette tip tray is from one manufacturing run;

(b) associating a serial number to the pipette tip tray, wherein the serial number is unique to the manufacturing run of each of the components;

(c) identifying a serial number associated with the pipette tip tray; and (d) determining the manufacturing run of one of the components of the pipette tip tray from the serial number affixed to the pipette tip tray.

14. The process of claim 13, wherein the manufacturing run of the pipette tips is determined from the serial number associated with the pipette tip tray.

15. The process of claim 13, wherein the pipette tip tray component comprises a rack and manufacturing run of the rack is determined from the serial number associated with the pipette tip tray.

16. The process of claim 13, wherein the manufacturing run of the card is determined from the serial number associated with the pipette tip tray.

17. The process of claim 13, wherein the rack component comprises a lid.

18. The process of claim 14, wherein the pipette tips in the pipette tip tray further comprise filter components from one manufacturing run and the manufacturing run of the filter components is determined from the serial number associated with the pipette tip tray.

19. The process of claim 14, wherein the pipette tip tray is in a container comprising a coefficient of variation (CV) value affixed to the container, which CV value was determined for pipette tips in the manufacturing run.

20. The process of claim 14, wherein the pipette tip tray comprises a coefficient of variation (CV) value affixed to the tray, which CV value was determined for pipette tips in the manufacturing run.

21. The process of claim 13, wherein associating a serial number to the pipette tip tray comprises affixing a serial number to the pipette tip tray.

* * * * *